United States Patent [19]
Bolander et al.

[11] Patent Number: 5,560,337
[45] Date of Patent: Oct. 1, 1996

[54] KNOCK CONTROL USING FUZZY LOGIC

[75] Inventors: William J. Bolander, Clarkston; Rimas S. Milunas, Rochester Hills, both of Mich.

[73] Assignee: Saturn Corporation, Troy, Mich.

[21] Appl. No.: 106,842

[22] Filed: Aug. 16, 1993

[51] Int. Cl.$^6$ .................................................. F02P 5/152
[52] U.S. Cl. ...................................... 123/425; 364/431.08
[58] Field of Search ................................ 123/425, 435; 364/431.08

[56] References Cited

U.S. PATENT DOCUMENTS

| | | | |
|---|---|---|---|
| 4,276,861 | 7/1981 | Kearney et al. | 123/425 |
| 4,899,710 | 2/1990 | Takahashi | 123/425 |
| 5,090,382 | 2/1992 | Bolander et al. | 123/425 |
| 5,163,404 | 11/1992 | Witkowski et al. | 123/425 |

FOREIGN PATENT DOCUMENTS

| | | | |
|---|---|---|---|
| 5-10235 | 1/1993 | Japan | 123/425 |
| WO93/19293 | 9/1993 | WIPO . | |

*Primary Examiner*—Andrew M. Dolinar
*Attorney, Agent, or Firm*—Michael J. Bridges

[57] ABSTRACT

Internal combustion engine ignition timing is adjusted in response to a sensed knock condition and in response to a determination of engine knock propensity through application of fuzzy logic, wherein an inference engine comprised of a predetermined knowledge rulebase generates a set of truths in response to application of a set of input signals from a set of membership functions. The set of truths are combined according to both relative and absolute strength in indicating engine knock propensity.

3 Claims, 7 Drawing Sheets

KNOCK CONTROL USING FUZZY LOGIC

FIELD OF THE INVENTION

This invention relates to knock control in internal combustion engines and, more particularly, to evaluation of the veracity of knock control signals using fuzzy logic techniques.

BACKGROUND OF THE INVENTION

Detection of cylinder knock in internal combustion engines is known. For example, it is known that the amplitude and duration of engine vibration at certain frequencies can indicate the presence of cylinder knock. Accordingly, conventional knock detection approaches may measure radiation from the engine at certain calibrated frequencies, and diagnose knock from the duration and magnitude of such radiation. Spark timing adjustments are made in direction to reduce or eliminate the diagnosed knock. Such adjustments generally compromise other control goals, such as engine performance or fuel economy, and thus should be made with discretion. For example, such adjustments should only be made when truly needed to mitigate the well-known negative effects of knock. Accurate knock detection is therefore desirable to diagnose when spark timing adjustments are truly needed.

Conventional knock detection approaches that diagnose knock from simple frequency analysis are susceptible to noise at the frequencies of interest. In typical internal combustion engine applications, this noise may be caused from such periodic events as piston bore contact or valve seating contact. False knock detection may result from this susceptibility to noise, resulting in unnecessary and detrimental spark timing adjustment.

It has been proposed that a functional relationship exists between an engine's propensity for knock and certain engine operating conditions. An estimation of an engine's propensity to knock at its present operation level as indicated by sensed operating conditions can be used to characterize the degree of confidence in sensed vibration as indicating a knock condition and not simply a noise condition.

Comparison of sensed engine operating conditions to fixed thresholds has been proposed for estimation of engine knock propensity. A series of binary conclusions, based on whether the sensed condition falls above or below the magnitude of the corresponding fixed threshold, are used to estimate knock propensity. Such binary conclusions discard valuable information on the magnitudinal relationship between the sensed parameters and their fixed thresholds, reducing the accuracy of the estimation of knock propensity, and increasing the potential that ignition timing may be retarded unnecessarily, degrading engine performance.

A generally known development in control theory is fuzzy logic, in which the shortcomings associated with hard thresholds and binary conclusions are avoided and the entire knowledge rulebase is available for evaluation in the control.

Accordingly, it would be desirable to adapt an approach to estimation of engine knock propensity incorporating the benefits of fuzzy logic, for increased accuracy in the estimation.

SUMMARY OF THE INVENTION

The present invention overcomes the shortcomings of prior approaches to engine knock confidence estimation through application of fuzzy logic to the estimation.

Specifically, a plurality of engine operating parameters are sensed and normalized via a set of weighted membership functions. The normalized parameters are passed through an inference engine according to a predetermined rulebase to form a set of truths, each of which provides information on engine knock propensity. The truths are individually positioned according to their individual potential to contribute misleading knock information, and are weighted with respect to each to indicate the magnitude of their relative contributions to the knock propensity estimation. The positioned, weighted truths are then combined to form a knock confidence value, the magnitude of which indicates the degree of confidence that should be placed in any sensed knock condition for the set of sensed engine operating parameters.

In a further aspect of this invention, the knock confidence value may be used to adjust a knock based ignition retard signal to reflect the determined level of confidence that such retard is appropriate.

In yet a further aspect of this invention, the knock confidence value may be used in adaptive spark retard in which knock based retard values are learned, stored and adjusted over the life of the engine as a function of engine operating level, by adjusting the degree of learning in response to the confidence value.

Accordingly, through the control of the present invention incorporating fuzzy logic techniques, valuable information on a variety of engine operating parameters is retained throughout the knock control process, to estimate knock propensity, and to compensate for engine knock both in a direct response to a sensed knock condition and in a learned response to a sensed engine operating level.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
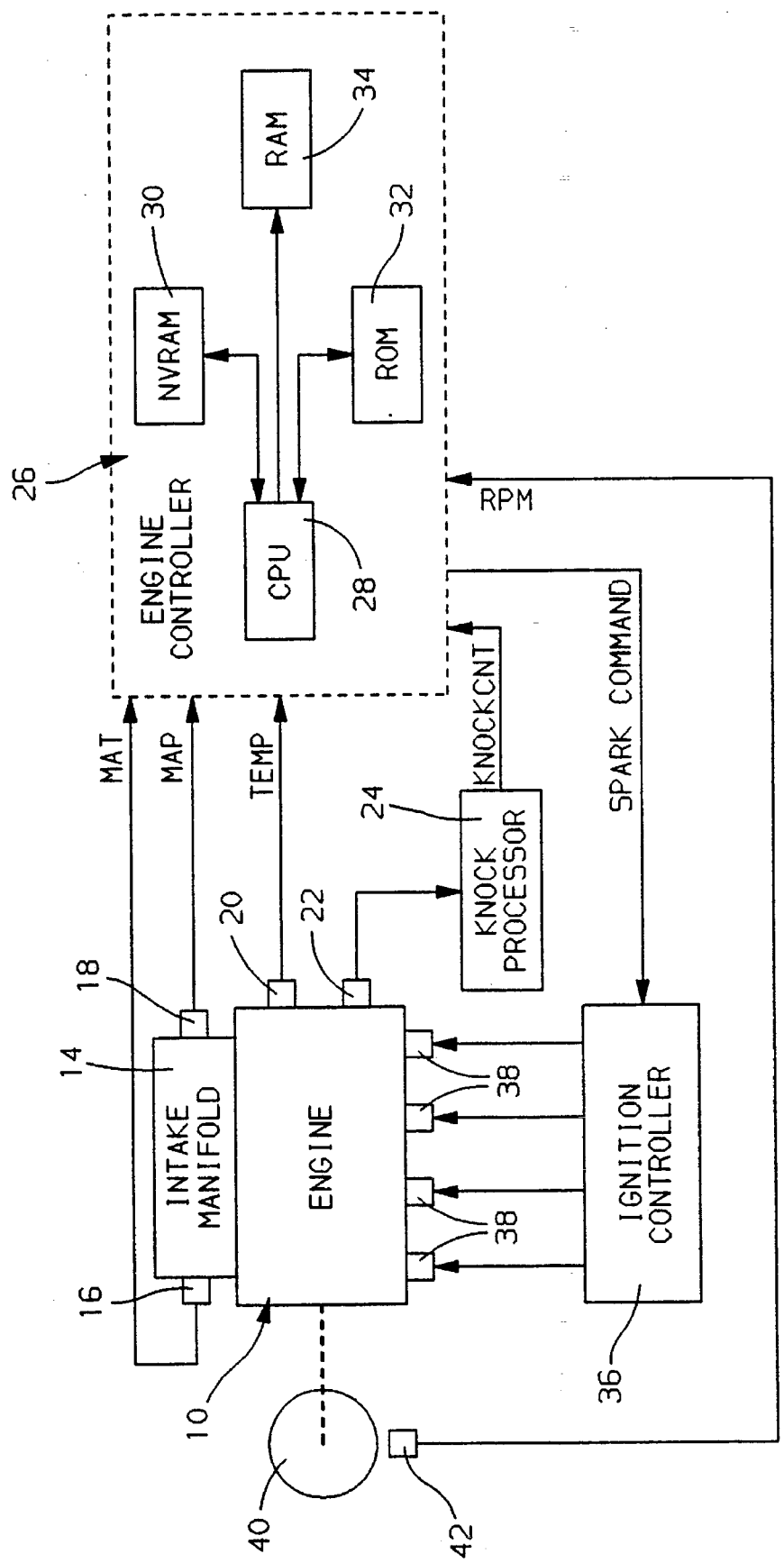
FIG. 1 is an engine and associated control hardware for knock control in accord with the preferred embodiment of this invention.

Referring to FIG. 1, an internal combustion engine 10 is provided intake air and fuel through an intake manifold 14, wherein manifold air temperature MAT is measured via conventional manifold absolute temperature sensor 16, and manifold absolute air pressure MAP is measured by conventional MAP sensor 18.

Disk 40 rotates with an engine output shaft such as an engine crankshaft (not shown), with conventional variable reluctance sensor 42 positioned to sense passage of teeth on disk 40 and output a periodic signal RPM having a frequency proportional to the rate of rotation of disk 40 and thus of the engine output shaft. Temperature sensor 20, such as a conventional thermocouple is located on the engine in position to sense engine coolant temperature and output a signal TEMP indicative thereof.

Knock sensor 22 is provided, which may be any vibration or other sensor known in the art for producing a signal of a knock related engine parameter, such as a sensor for sensing engine vibration radiation within a predetermined frequency range. Sensor 22 outputs a signal to knock processor 24 which substantially reduces the noise in the output signal of sensor 22 and generates and outputs a knock signal KNOCKCNT which may be in the form of a counter value which is periodically cleared and is incremented upon each identification of a sensed knock event or condition by sensor 22.

Engine controller 26 includes such conventionally known elements as a central processing unit CPU 28, and data storage units including read only memory ROM 32, random access memory RAM 34 and non-volatile random access memory NVRAM 30. The engine controller 26 processes such input signals as MAT, MAP, TEMP, KNOCKCNT, and RPM, and generates output commands for engine control actuators, for example that control fuel, air and spark to engine 10. The control of fuel and air to the engine may be carried out in a conventional manner, for example to maintain an air/fuel ratio consistent with a desired engine performance, fuel economy, and level of engine exhaust gas pollutants.

Figure 2A:
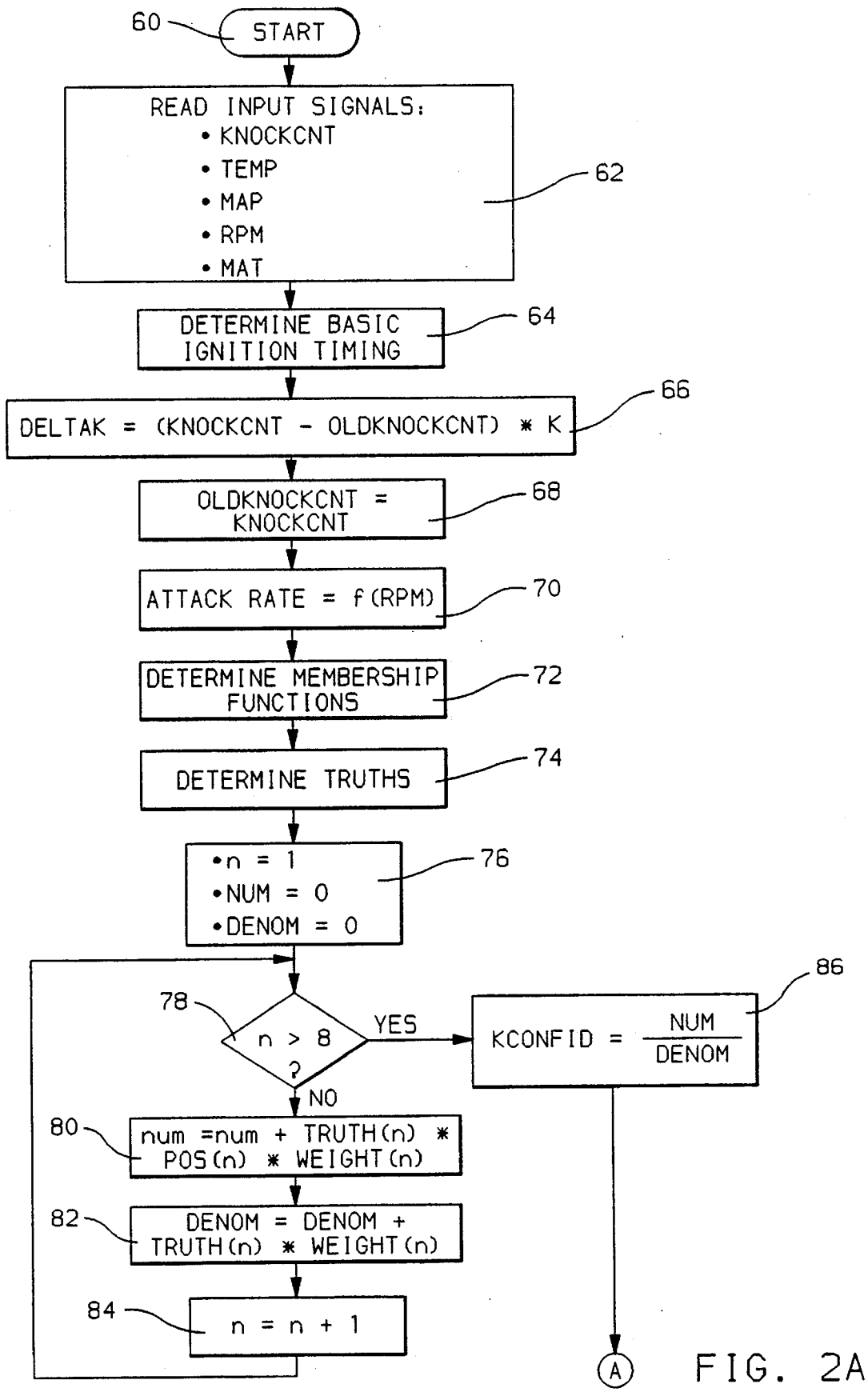
FIGS. 2A–3 are computer flow diagrams illustrating steps used to carry out a control process in accord with the preferred embodiment of this invention.
Figure 2B:
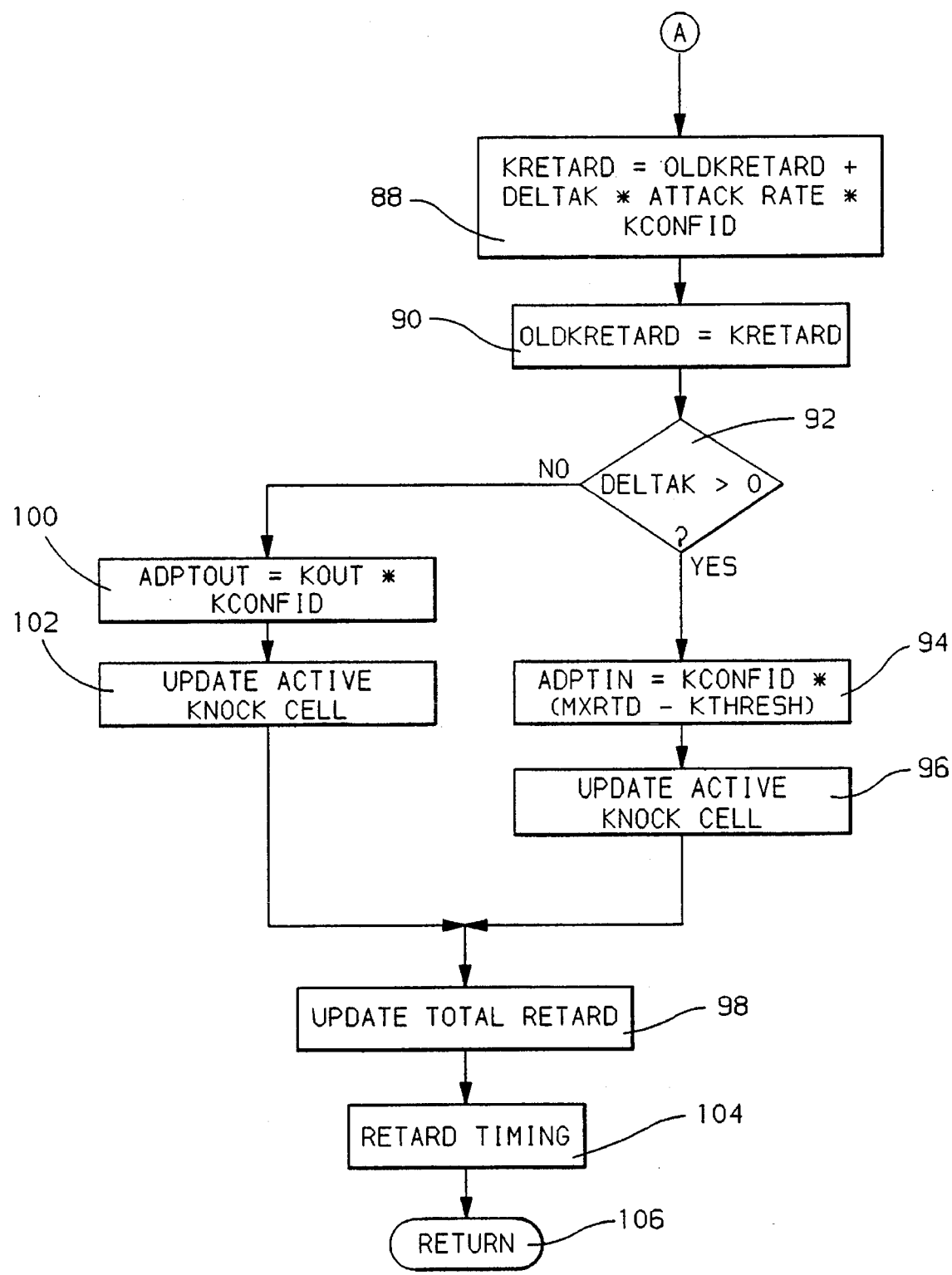
Figure 3:
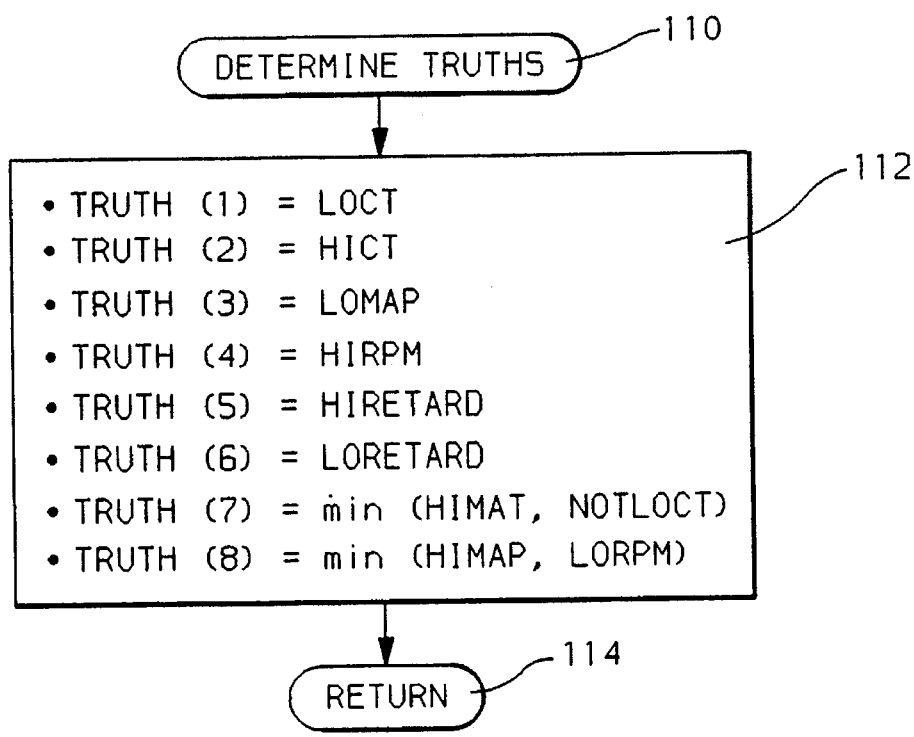

The control of the timing of the conventional spark command issued by engine controller 26 in this embodiment is computed in accord with the routines of FIGS. 2A–3. Engine controller 26 periodically executes these routines when SPARK COMMAND is to be computed, in a manner generally understood in ignition control. SPARK COMMAND, once computed, is stored in engine controller memory, such as RAM 34, and is issued to IGNITION CONTROLLER 36 when at least one of spark plugs 38 are to be ignited. Ignition may be provided based on engine angular position as indicated by the signal RPM, in accord with well-known engine control practices. IGNITION CONTROLLER 36 conditions SPARK COMMAND and provides appropriate commands to appropriate members of the set of spark plugs 38, as is generally known in the art.

The ignition control of the present invention responds to a sensed engine knock condition and to an estimate of engine knock propensity to adjust spark timing for knock minimization. In the preferred embodiment, such operations are carried out by a series of steps executed by engine controller 26, such as by a series of operations stored in ROM 32 and periodically referenced by engine controller 26, such as every 12.5 milliseconds while the engine controller is operating.

Specifically, such operations are illustrated by FIGS. 2A, 2B and 3, and are started at step 60 of FIG. 2A. The routine of FIG. 2(A,B) then moves to step 62 to read the present value of input signals used in the present ignition control, such as KNOCKCNT, TEMP, MAP, RPM, and MAT. These signals may be filtered by the engine controller 26 via conventional analog signal filtering processes to reduce signal noise and other disturbances present in the signals.

In a specific example, the signal KNOCKCNT may be filtered by a timing window in the engine controller 26 before use by the routine of FIG. 2(A,B), such as described in U.S. Pat. No. 5,163,404, assigned to the assignee of this invention, wherein the engine controller selectively filters KNOCKCNT from knock processor 24 (FIG. 1) based on a positional relationship between the engine position at the occurrence of the knock condition and an engine position window referenced from cylinder top dead center TDC.

Returning to FIG. 2(A,B), after reading the several input signals, the routine moves to step 64 to determine basic ignition timing in a manner generally understood in the art, for example as a function of RPM, MAP and other sensed operating inputs from engine 10. For example, the basic ignition timing may be a value derived from a lookup table in ROM 32 (FIG. 1) referenced from a two-dimensional array of RPM and MAP, using the present sensed RPM and MAP signals. The referenced timing value may be further modified by other engine operating parameters, such as TEMP, fuel composition, as is generally known in the art. This basic ignition timing may be expressed for convenience in degrees after cylinder TDC of the present engine cylinder to be ignited.

After computing basic ignition timing at step 64, a change in knock value DELTAK is computed at step 66, as proportional to the difference between the present knock count KNOCKCNT and OLDKNOCKCNT, which is the knock count from the most recent prior iteration of the routine of FIG. 2(A,B). DELTAK indicates any new sensed potential engine knock condition. Next, the present KNOCKCNT is stored as OLDKNOCKCNT at step 68.

The routine then proceeds to step 70, to determine ATTACK RATE as the conversion factor to compute degree of knock retard from change in sensed knock counts, using generally known relationships between knock and spark retard. It is generally known that the ATTACK RATE may be determined as a function of engine speed RPM, such as from a lookup table in ROM 32 (FIG. 1). After determining ATTACK RATE, the routine moves to steps 72–88, to determine a degree of retard appropriate for the present sensed knock condition in accord with the principles of this invention.

Specifically, the routine moves to step 72, to determine a series of membership functions from the input signals read at step 62. FIGS. 4–13 illustrate a set of membership functions used in this embodiment. The membership functions, consistent with conventional fuzzy logic control, subdivide the input signals into categories in accord with the domain of a predetermined rulebase, and normalize the inputs signals within each category. In this embodiment, it was determined that the rulebase required the following membership function categories:

| Input Signal | Category | Variable Name |
|---|---|---|
| TEMP | Low temp. | LOCT |
| | High temp. | HICT |
| | Not low temp. | NOTLOCT |
| MAP | Low pressure | LOMAP |
| | High pressure | HIMAP |
| RPM | Low speed | LORPM |
| | High speed | HIRPM |
| TOTAL RETARD | Low Retard | LORETARD |
| | High Retard | HIRETARD |
| MAT | High air temp. | HIMAT |

Figure 4:
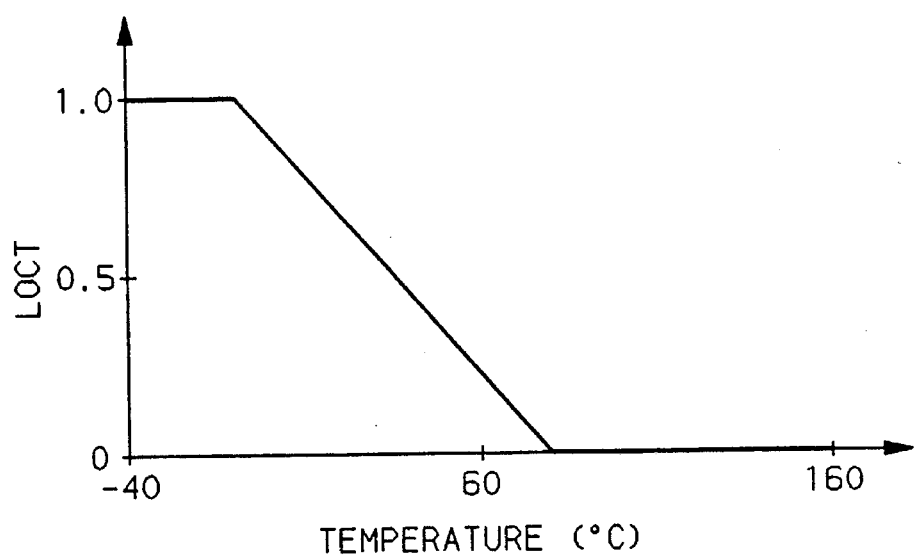
FIGS. 4–13 are diagrams illustrating membership functions used to carry out the preferred embodiment in accord with the flow diagrams of FIGS. 2 and 3.
Figure 5:
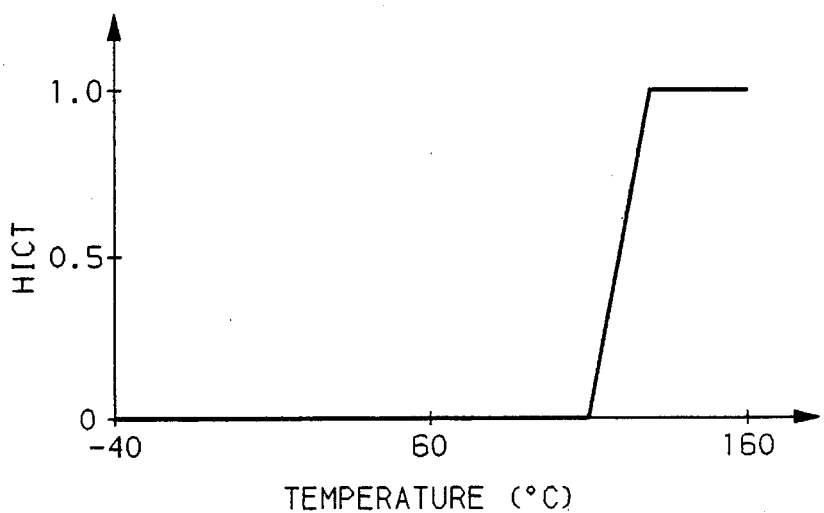
Figure 6:
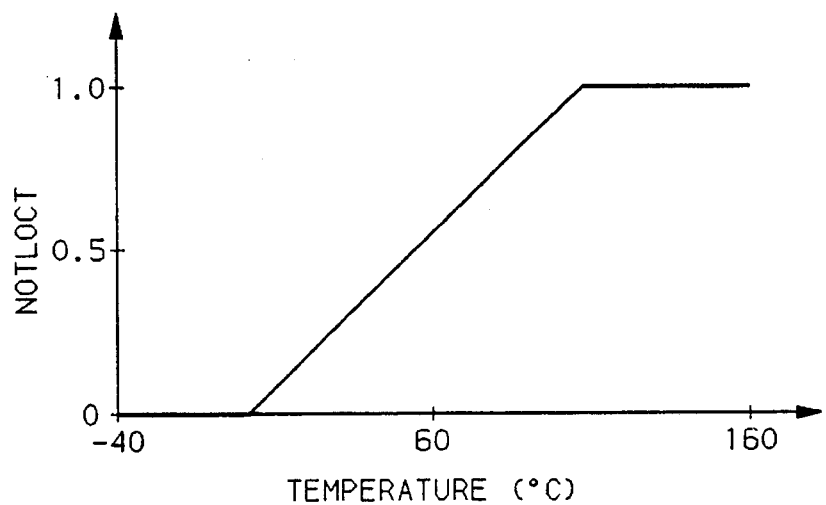

The normalized membership functions for these categories are illustrated in FIGS. 4–13. The magnitude of the output of the membership functions indicates the strength of membership in the corresponding category. For example, the magnitude of the low coolant temperature membership function output LOCT indicates generally how low coolant temperature is within a low temperature range, as illustrated in FIG. 4. FIG. 5 illustrates such a relationship in a high coolant temperature range, as reflected in the magnitude of the output of the high coolant temperature membership function HICT. Still further, the degree that sensed coolant temperature TEMP is not within the low range is indicated by the output magnitude of the not low coolant temperature membership function NOTLOCT, as illustrated in FIG. 6.

Figure 7:
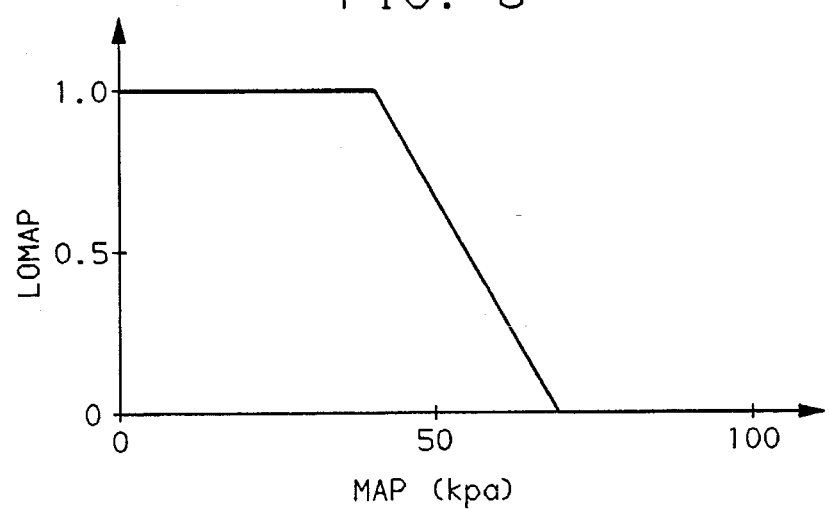
Figure 8:
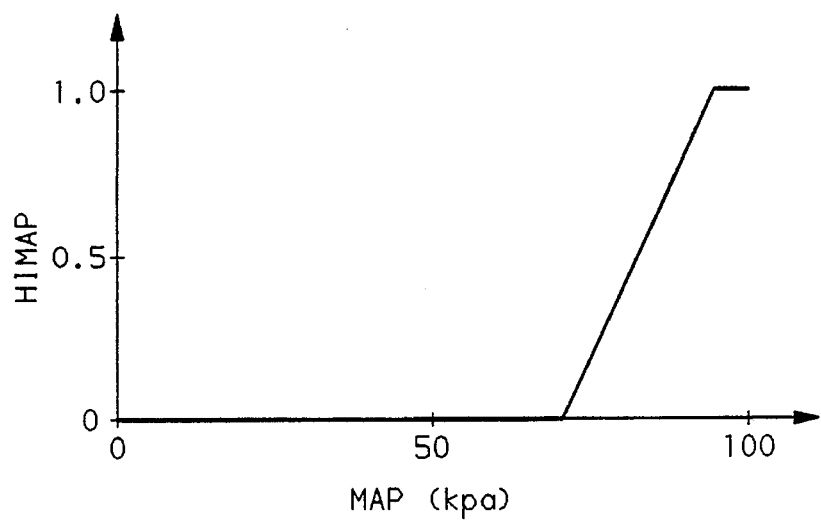

Two membership functions attempt to quantify engine manifold absolute pressure MAP, for application to the rulebase of the inference engine of the present embodiment of the invention. Specifically, membership function having output LOMAP indicates the degree of membership of MAP within a low pressure range, as illustrated in FIG. 7, and membership function having output HIMAP indicates the degree of membership of MAP within a high pressure range, as illustrated in FIG. 8.

Figure 9:
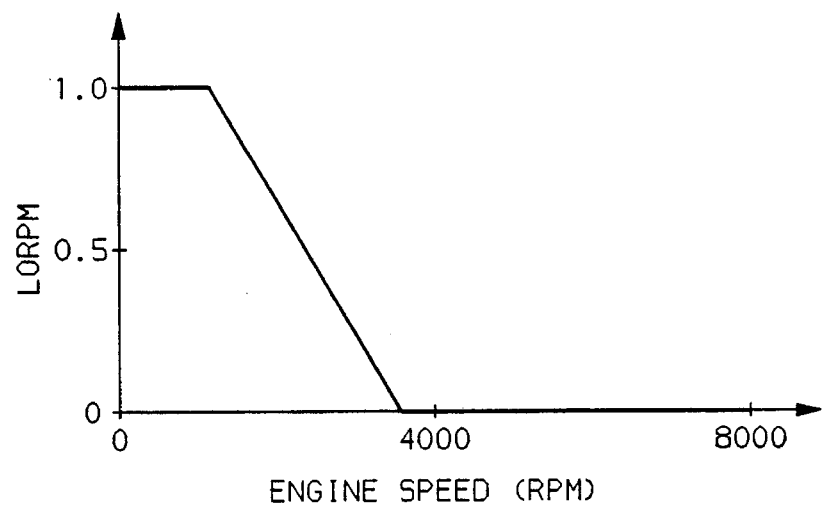
Figure 10:
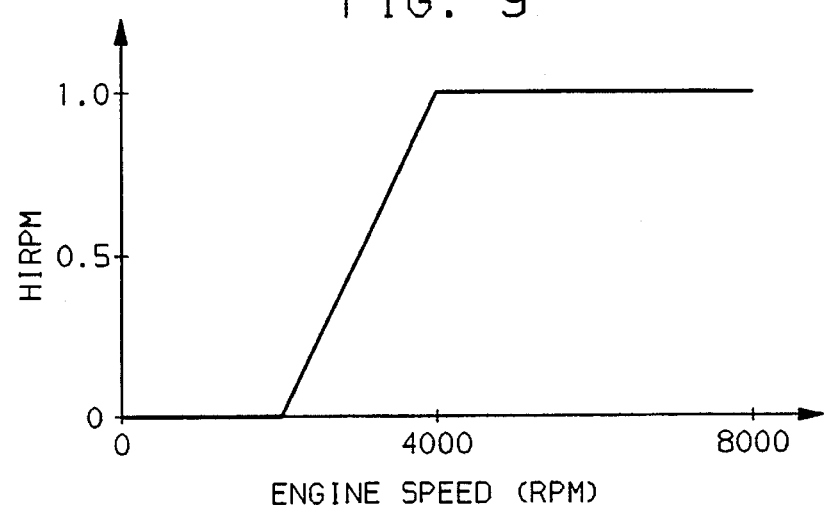

Two membership functions attempt to quantify engine speed RPM for application to the rulebase of the inference engine of the present embodiment. These include membership function having output LORPM, which indicates the degree of membership of RPM within a low engine speed range, as illustrated in FIG. 9, and membership function having output HIRPM, which indicates the degree of membership of RPM within a high engine speed range as illustrated in FIG. 10.

Figure 11:
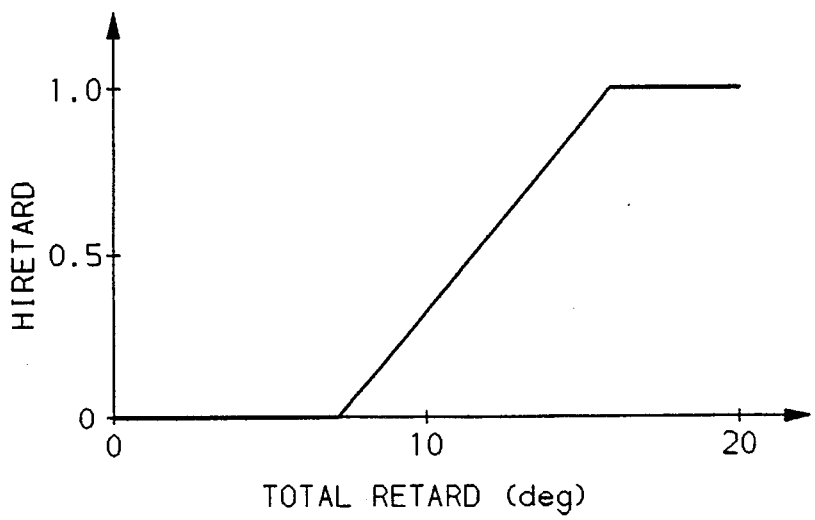
Figure 12:
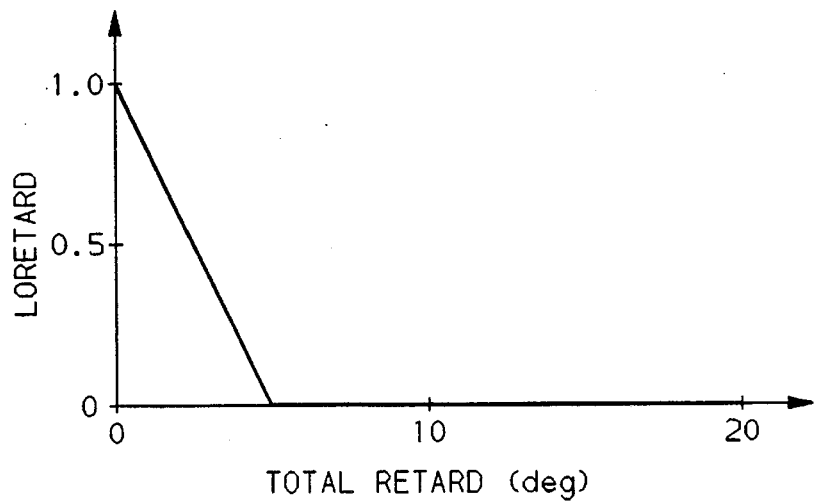

Total engine spark retard TOTAL RETARD is assigned two categories in accord with the needs of the rulebase of the inference engine applied to the present embodiment of this invention. Specifically, membership function having output HIRETARD indicates a degree of membership of TOTAL RETARD within a high total spark retard range as illustrated in FIG. 11, and membership function having output LORETARD indicates a degree of membership of TOTAL RETARD within a low total spark retard range as illustrated in FIG. 12. TOTAL RETARD, as is generally understood by those skilled in the art, is an aggregation of all contributions to spark retard in the engine, including knock based retard. The most recent computed TOTAL RETARD, such as that computed in the most recent prior iteration of the routine of FIG. 2(A,B), may be used in the TOTAL RETARD membership functions.

Figure 13:
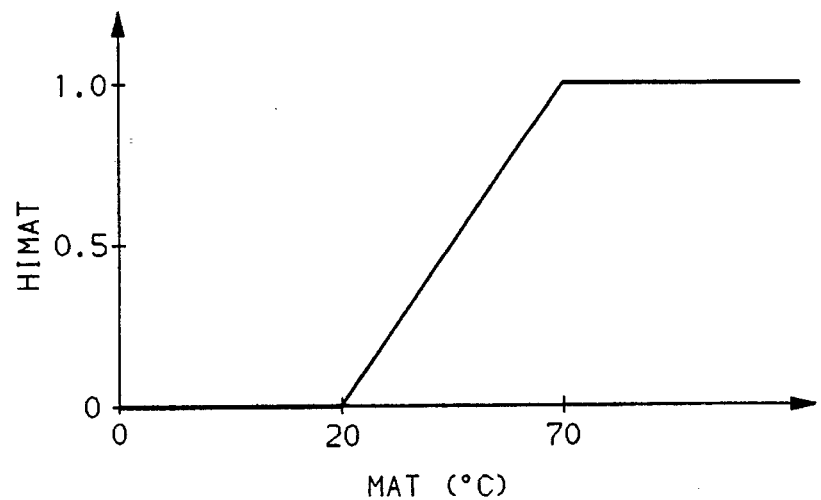

Finally, manifold air temperature MAT has a single category assigned to it for application to the rulebase of the inference engine of the present embodiment, in which membership function having output HIMAT indicates a degree of membership of MAT in a high temperature range, as illustrated in FIG. 13.

The inventors intend the specific membership functions illustrated in FIGS. 4–13 to serve merely as examples of one embodiment of this invention, as various input signal combinations may be used as needed by an associated rulebase in an estimation of engine knock propensity in accord with the principles of this invention.

Returning to step 72 of FIG. 2(A,B), after determining membership function output values via the relationships illustrated in FIGS. 4–13, the routine moves to step 74 to apply the membership functions to a knowledge rulebase to determine a set of associated truths, in accord with conventional fuzzy logic based control practice. The transformation of the membership functions into a set of truths is set out in FIG. 3, to be described. The rules forming the rulebase used to transform the membership functions is determined in an analysis of the impact of the membership functions on engine knock propensity, for example, by analyzing engine knock propensity while varying selected engine input signals in a controlled test environment and recording engine knock sensitivity as a function of each of the varied engine input signals or combinations of signals.

After determining the truths at step 74, the routine of FIG. 2(A,B) advances to step 76, to initialize local variables used to compute a confidence value indicative of engine knock propensity for the present iteration of the routine of FIG. 2(A,B). Specifically, at step 76, index n is set to one, and variables NUM and DENOM are cleared.

The routine then moves to steps 78 through 86 to compute KCONFID as a weighted sum of the truths determined at step 74. In detail, the routine first moves to step 78 to determine if the index n exceeds eight, the number of truths to be included in the computation in this embodiment. If n exceeds eight, the routine moves to step 86, to be described. Otherwise, the routine moves to step 80 to add a weighted value of the truth indexed by n to the present value of NUM, according to the following equation $$NUM=NUM+TRUTH(n)*POS(n)*WEIGHT(n)$$

in which TRUTH(n) is the nth truth in the series of truths determined at step 74, POS (n) is the nth position value, and WEIGHT(n) is the nth weight value.

The position values may be determined in a calibration step as the extent that the associated truth indicates engine knock propensity. In this embodiment, the position values are normalized between 0 and 10, wherein a truth having a low position value, such as zero would indicate an engine operating condition associated with a low knock propensity, and a truth having a high position value, such as ten would indicate an engine operating condition associated with a high knock propensity.

The weight values are used to weight the truths with respect to each other, to reflect any variance in the degree by which the rules indicate a knock propensity. In this embodiment, the weights are normalized between zero and ten, wherein a weight near zero indicates the associated truth provides little indication of engine knock propensity and can be easily overcome by another truth having a higher weight, and a weight of ten indicates the associated truth is very informational on engine knock propensity when compared to the other truths.

In the present embodiment, the following are representative position and weight values for associated truths

| TRUTH | POSITION | WEIGHT |
| --- | --- | --- |
| 1 | 0 | 10 |
| 2 | 7.5 | 2.5 |
| 3 | 0 | 10 |
| 4 | 2.5 | 2 |
| 5 | 0 | 10 |
| 6 | 8 | 2 |
| 7 | 10 | 2.5 |
| 8 | 10 | 2.5 | in which the truths are to be defined in FIG. 3. For example, the seventh and eighth truths have positions of ten, indicating maximum knock propensity in the presence of the seventh or eighth truths. However, these truths have relatively low weights of 2.5, indicating they are relatively weak when compared to any other truths that may be present in indicating a knock condition. As such, any truth that is present in comparable magnitude and with a high weight value, such as the first, third, or fifth truths, would largely overrule the presence of the seventh or eighth truths.

Specifically, due to the zero position value of the first, third and fifth truths, indicating an associated low knock propensity in the presence of these truths, their presence along with a presence of the seventh or eighth truths would result in a low knock confidence value, due to the relatively large weight value of the first, third, or fifth truths.

Returning to step 80 of FIG. 2A, after determining NUM for the nth iteration of step 80, the routine moves to step 82 to determine DENOM as follows:

$$DENOM=DENOM+TRUTH(n)*WEIGHT(n).$$

The routine then increments index n and repeats the described step 78.

After processing steps 78–84 for all of the truths in the rulebase of the present fuzzy logic control, the routine moves to step 86, to calculate KCONFID, a knock confidence value as the quotient of NUM divided by DENOM. KCONFID is normalized between zero and one, and generally reflects a normalization of the POS() input, wherein a KCONFID value of zero indicates that, according to the entire rulebase, the present engine operating level is associated with virtually no propensity for engine knock, and with a value of one indicating that, according to the entire rulebase, the engine operating level is associated with a very high propensity for engine knock. As will be described, any knock condition sensed according to conventional knock sensing techniques, may be reduced by KCONFID before being used to determine an appropriate degree of knock based spark retard, or before being applied in an adaptive knock control technique.

After determining KCONFID at step 86, the routine moves to step 88 to determine KRETARD, the knock based spark retard value, as follows $$KRETARD=OLDKRETARD+DELTAK*ATTACK\ RATE*KCONFID$$

in which OLDKRETARD is the knock based spark retard as determined in the most recent prior iteration of the routine of FIG. 2(A,B), and as periodically decayed toward zero retard, as described. Accordingly, the degree by which the knock based spark retard is adjusted in response to a sensed potential knock condition may be reduced by KCONFID, wherein full adjustment is permitted when knock confidence is high, but the amount of adjustment is decreased as KCONFID decreases, and no retard adjustment is permitted when KCONFID is zero, indicating engine knock will normally not occur at the current engine operating level.

After determining KRETARD at step 88, the routine moves to step 90 to update OLDKRETARD as KRETARD. In accord with conventional knock based spark retard control, this value will be periodically decayed toward zero retard, such as in a time based interrupt driven routine. For example, in this embodiment, approximately every 100 milliseconds while the engine controller 26 is operating, the value stored as OLDKRETARD will be decreased by 26 percent of its magnitude, to decay knock based retard toward zero retard. The routine in which OLDKRETARD is decayed in this embodiment is not illustrated, but may be a series of instructions stored in ROM 32 (FIG. 1) which are executed upon occurrence of a periodic time base engine controller 26 interrupt.

Returning to FIG. 2B, after updating OLDKRETARD at step 90, the routine advances to step 92 to determine if any potential engine knock condition was sensed for the present iteration of the routine of FIG. 2(A, B) as would be reflected in an increase in KNOCKCNT, as described at step 66. If DELTAK does not exceed zero, indicating no increase in KNOCKCNT since the last iteration of the routine of FIG. 2(A,B), the routine moves to steps 100–102 and 94–96 to apply the determined knock confidence value in an adaptive learned knock based spark retard approach, which may be any conventional spark retard learning algorithm.

In adaptive learned spark retard, for example as illustrated in U.S. Pat. No. 5,090,382, assigned to the assignee of this application, a series of cells are defined as a function of an engine operating level, such as may be indicated by engine speed and engine load. Knock based spark retard values are stored for each of the cells in nonvolatile memory NVRAM 30 (FIG. 1) and are adjusted as necessary in response to sensed knock conditions. The learned retard from an active cell is applied in a feedforward manner to adjust ignition timing accordingly.

In the event the engine is not knocking, the learned retard in the active cell is slowly decreased, for example according to a predetermined decay rate, to minimize unnecessary retard. However, while sensed knock conditions are present in the engine 10 (FIG. 1), the spark retard may be increased in proportion to the magnitude or duration of the sensed knock condition.

In the routine of FIG. 2(A,B), the determined confidence value KCONFID may be used to affect the degree of learning in the active cell, in accord with the degree of confidence in the sensed knock condition that traditionally controlled the degree of learning. Steps 100–102 of FIG. 2B illustrate how this learning occurs in the absence of a sensed knock condition in this preferred embodiment, and steps 94–96, to be described, illustrate how this learning is carried out in the presence of a sensed knock condition in this embodiment.

Specifically, if DELTAK is not greater than zero at step 92, indicating that no additional knock counts were received over the most recent sampling period, the routine moves to step 100, to calculate ADPTOUT, the value by which learned retard in the active cell is reduced, as follows $$ADPTOUT=KOUT*KCONFID$$

in which KOUT is a constant indicating a calibrated amount of reduced learned retard per unit time, in accord with generally known adaptive retard practice, for example as illustrated in U.S. Pat. No. 5,090,382, assigned to the assignee of this application. Accordingly, the amount of reduction in any learned retard in the active cell will be reduced in accord with the determined confidence value KCONFID, such that only sensed knock conditions associated with a high confidence value will affect the learned value stored in each cell. Next, the routine advances to step 102, to update the present active cell in accord with the determined ADPTOUT value. The routine then moves to step 98, to be described.

Returning to step 92, if DELTAK is greater than zero, the routine moves to step 94, to calculate ADPTIN, a value by which any learned retard in the present active cell will be increased in response to the sensed present knock condition as follows $$ADPTIN=KCONFID*(MXRTD-KTHRESH)$$

in which MXRTD is a maximum KRETARD over a predetermined period, for example, since the most recent sensed potential knock condition, and KTHRESH is threshold level of spark retard, below which no learning will take place. KTHRESH is used to limit learning of retard to only more significant sensed knock conditions, as it is assumed that minor knock conditions, such as those less than KTHRESH, can be acceptably compensated without resort to the present adaptive approach.

After determining ADPTIN at step 94, the routine moves to step 96 to update the present active cell in accord with the determined ADPTIN value. The routine of FIG. 2(A,B) then proceeds to step 98, to update TOTAL RETARD, which may, as is generally known in the art, be a sum of such retard components as KRETARD, any retard value stored in the present active cell, and other conventionally known retard values responsive to such engine parameters as engine coolant temperature TEMP, manifold air temperature MAT, transmission based retard, such as may be required during a transmission upshift, or traction control based retard. After determining TOTAL RETARD for the present iteration of the routine of FIG. 2(A,B), the routine moves to step 104, to apply TOTAL RETARD to a spark timing command, to retard ignition timing accordingly. At appropriate rotational positions of engine 10 (FIG. 1) the spark timing command as retarded through the steps of FIG. 2(A,B) will be applied to ignite appropriate spark plugs of engine 10.

After having retarded timing at step 104, the routine moves to step 106 to return to any routine that may have been operating at the time the routine of FIG. 2(A,B) was initiated. As described, the routine of FIG. 2(A,B) in accord with the present embodiment will periodically, for example on a time base of approximately 12.5 milliseconds, be re-executed to update TOTAL RETARD so as to reflect any evolving engine needs.

Referring to FIG. 3, eight truths are shown as comprising the inference engine of the present embodiment, as developed through a conventional fuzzy logic based design and calibration procedure. This procedure analyzes relationships between engine operating parameters to develop rules characterizing certain system behavior, such as the propensity of an engine to knock under certain conditions, as described.

The steps of FIG. 3 are executed as called from step 74 of the routine of FIG. 2(A,B), to determine a set of truths by passing the membership functions through the inference engine. The routine of FIG. 3, once called from step 74 of the routine of FIG. 2(A,B), starts at step 110 and moves directly to a list of rules at step 112, in which rules one through six are simply the membership functions shown, passed directly through the inference engine to become truths one through six.

The rule defining TRUTH(7) is a combination of two membership functions, as follows TRUTH (7)=min(HIMAT, NOTLOCT)

which is consistent with rule form known generally in fuzzy logic design, in which the value assigned to the truth is the minimum value of a predetermined group of membership functions.

For the present embodiment, it has been determined that unique information on engine knock propensity may be derived from a combination of manifold air temperature MAT and engine coolant temperature TEMP. By developing appropriate scaling of the membership functions of these inputs, and by designing an appropriate rule, such as the rule defining TRUTH(7), such information may be incorporated into an estimation of engine knock propensity in a precise manner.

The rule defining TRUTH(7) provides that the membership functions HIMAT, from FIG. 13, and NOTLOCT from FIG. 6, interact in such a way that the smaller of the two membership functions defines the strength or magnitude of TRUTH(7).

Similarly, it has been determined that manifold absolute pressure MAP and engine speed RPM interact to provide information on engine knock propensity, wherein, for example, a high knock propensity would be associated with high MAP and low RPM. By characterizing the interaction of MAP and RPM in the rule defining TRUTH(8), such information is incorporated into the estimation of knock propensity. Specifically, TRUTH(8) is defined as TRUTH (8)=min (HIMAP, LORPM)

in which the magnitude of TRUTH(8) is defined as the minimum of the magnitudes of HIMAP as illustrated in FIG. 8 and LORPM as illustrated in FIG. 9.

After defining the eight TRUTHS in the inference engine of the present embodiment, the routine of FIG. 3, returns, via step 114, to the routine of FIG. 2(A,B).

The preferred embodiment for the purpose of explaining this invention is not to be taken as limiting or restricting the invention since many modifications may be made through the exercise of skill in the art without departing from the invention.

The embodiments of the invention in which a property or privilege is claimed are described as follows:

1. An ignition timing control method responsive to a sensed knock condition in internal combustion engine cylinders, comprising the steps of:

determining a spark retard command in response to the sensed knock condition;

sensing a predetermined set of engine operating conditions;

setting a plurality of membership functions based on the sensed predetermined set of engine operating conditions;

applying the set plurality of membership functions to a fuzzy inference engine having a knowledge rulebase for generating a set of truths responsive to the application of the set plurality of membership functions;

normalizing the set of truths according to the relative degree each of the set of truths indicates an engine knock condition;

positioning the normalized set of truths according to the absolute degree each of the set of truths indicates an engine knock condition;

calculating a spark retard adjustment as a predetermined function of the normalized, positioned set of truths;

adjusting the spark retard command in accord with the calculated spark retard adjustment;

adapting a learned spark retard value, by (a) selecting an active learning cell, (b) adjusting a learned spark retard value corresponding to the active learning cell as a predetermined function of both the sensed knock condition and the set of truths;

modifying the spark retard command in accord with the adjusted learned spark retard value; and controlling ignition timing in accord with the spark retard command.

2. An engine ignition timing control method for modifying internal combustion engine ignition timing through application of input values to an inference engine including a predetermined rulebase, comprising the steps of:

sensing engine knock;

sensing a predetermined set of engine operating conditions;

generating a set of input values through application of the predetermined set of engine operating conditions to a corresponding set of predetermined membership functions;

applying the set of input values to the inference engine to form a corresponding set of truth values;

normalizing the set of truth values according to the relative degree each of the set of truth values indicates an engine knock condition;

positioning the normalized set of truth values according to the absolute degree each of the set of truth values indicates an engine knock condition;

estimating engine knock propensity as a predetermined function of the positioned, normalized set of truth values;

modifying ignition timing in response to the sensed knock and in response to the engine knock propensity estimate; and issuing ignition timing control commands in accord with the modified ignition timing.

3. The method of claim 2, further comprising the steps of:

adapting a learned spark retard value, by (a) selecting an active learning cell, (b) adjusting a learned spark retard value corresponding to the active learning cell as a predetermined function of both the sensed knock and the estimated knock propensity; and modifying ignition timing in accord with the adjusted learned spark retard value.

* * * * *